Figure 1:
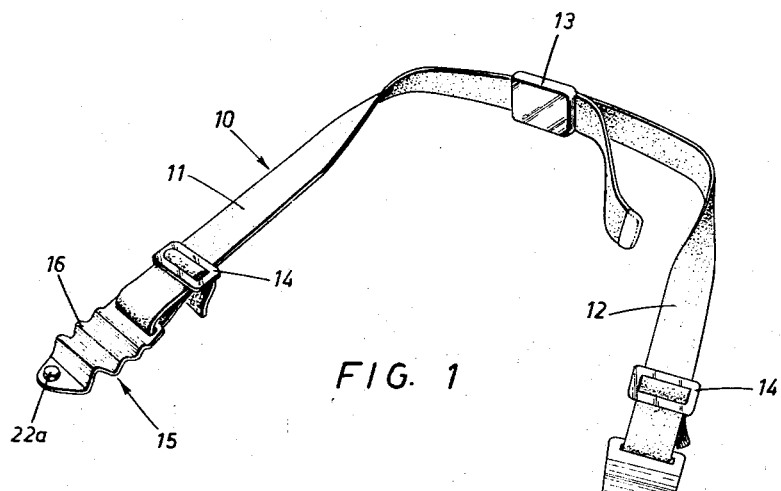

Jan. 2, 1968  W. H. C. VILLIERS  3,361,475
SAFETY BELT WITH SHOCK ABSORBING DEVICE
Filed June 4, 1965  2 Sheets-Sheet 1

INVENTOR.
WILLIAM H. C. VILLIERS
BY
Attorney

Jan. 2, 1968   W. H. C. VILLIERS   3,361,475
SAFETY BELT WITH SHOCK ABSORBING DEVICE
Filed June 4, 1965   2 Sheets-Sheet 2

INVENTOR.
WILLIAM H. C. VILLIERS
BY
Attorney

United States Patent Office 3,361,475
Patented Jan. 2, 1968

3,361,475
SAFETY BELT WITH SHOCK ABSORBING DEVICE
William H. C. Villiers, 82 Park Road N.,
Grimsby Beach, Ontario, Canada
Filed June 4, 1965, Ser. No. 461,275
8 Claims. (Cl. 297—386)

This invention relates to a safety belt provided with a shock absorbing device. More particularly, this invention relates to a safety belt having a shock absorbing device which absorbs energy at a progressively increasing rate.

Safety belts embodying this invention are particularly useful for the protection of passengers in motor vehicles and aircraft, but it will be appreciated that they may be used under other circumstances.

Most safety belts in use at the present time consist simply of a belt fabricated of a suitable material and having a buckle, the belt being directly connected to the floor or some other part of the motor vehicle or aircraft. Such safety belts are substantially unyielding. When the wearer of such a safety belt is thrown against the belt as a result of a collision, the belt may cause serious internal injuries to the user. Furthermore, because of the unyielding nature of such belts, failure of the belt or its buckle may result when large forces are applied thereto.

This problem has been recognized, and various attempts at its solution have been made. In this regard attention is directed to the following United States patents:

2,161,820—G. J. Kessenich—June 13, 1939
3,026,972—G. Hendry et al.—Mar. 27, 1962
3,106,989—L. Fuchs—Oct. 15, 1963
2,796,953—E. M. Becker—June 25, 1957
3,132,898—M. H. Kittelson—May 12, 1964
2,521,203—R. B. Cotton—Sept. 5, 1950
3,126,072—E. A. I. Johansson—Mar. 24, 1964

For the most part the shock absorbing devices described in the foregoing patents are relatively complex and expensive and not capable of absorbing energy at a progressively increasing rate. A number of the devices also are bulky in nature, and, in some instances, not capable of being used with existing safety belts.

In accordance with this invention, there is provided a shock absorbing device for a safety belt which is capable of absorbing energy at a progressively increasing rate, which is relatively simple and inexpensive, which is compact in nature, and which can be used with existing safety belts.

In brief, in accordance with the broad aspect of this invention there is provided a safety belt having a shock absorbing device secured thereto. The shock absorbing device comprises a corrugated strip of ductile material, the corrugations or undulations of which are of progressively increasing amplitude from one end of the strip to the other end thereof. The strip is adapted to resist deformation due to forces normally applied to the safety belt, but also is adapted to flatten out and elongate when excessive forces are applied to the safety belt.

A preferred embodiment of this invention not only embodies the features hereinbefore mentioned, but also is characterized by the pitch of adjacent ones of the corrugations increasing progressively from the aforementioned one end of the strip to the other end thereof.

Even more refined embodiments of this invention are chracterized by the thickness and/or width of the strip decreasing progressively from the aforementioned one end of the strip to the other end thereof.

In another embodiment of this invention, the shock absorbing device comprises a housing that contains two members of resilient, deformable material that define therebetween a generally sinusoidal channel of progressively increasing amplitude extending from one end of the members to the other end thereof. The safety belt is positioned in the channel with the part of the safety belt in the channel following the sinusoidal shape of the channel. The housing serves as a restraining device against which the members can exert force when compressed by force exerted on the belt tending to flatten the part of the safety belt between the members. In a preferred embodiment the channel also is of progressively increasing pitch from the aforementioned one end of the members to the other end thereof.

Figure 2:
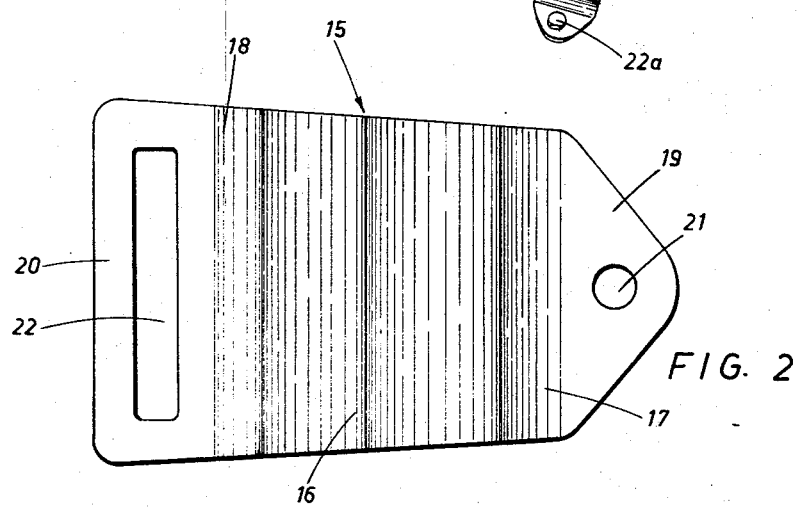
Figure 3:
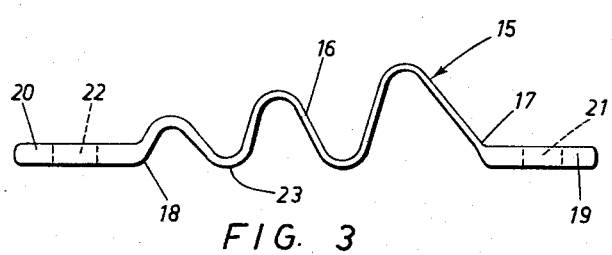
Figure 4:
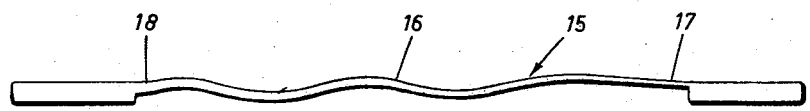
Figure 5:
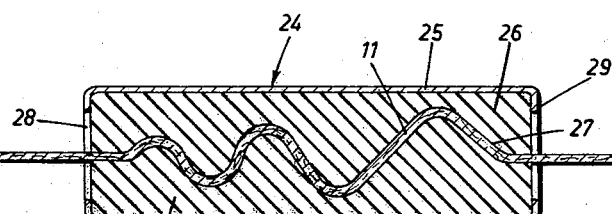

This invention will become more apparent from the following detailed description, taken in conjunction with the appended drawings, in which:

FIGURE 1 is a perspective view of a safety belt provided with shock absorbing devices embodying this invention, FIGURE 2 is a top elevation of a preferred embodiment of a shock absorbing device constructed in accordance with this invention, FIGURE 3 is a side elevation of the shock absorbing device shown in FIGURE 2, FIGURE 4 shows the shock absorbing device of FIGURE 3 in flattened out configuration, and FIGURE 5 is a section taken through another seat belt and shock absorbing device embodying this invention.

Referring to FIGURE 1, there is shown a safety belt 10 that consists of two pieces of webbing 11 and 12, a buckle 13, belt length adjusting devices 14 and shock absorbing devices 15 embodying this invention. Webbing 11 and 12, buckle 13 and belt length adjusting devices 14 are conventional in nature and need not be described in detail.

Referring now to FIGURES 2 and 3, it will be seen that shock absorbing device 15 includes a strip of material 16 that is bent into a series of upwardly extending waves or corrugations separated by troughs and being of progressively increasing amplitude from the end 18 of strip 16 to the end 17 thereof. Strip 16 is formed integral with or otherwise suitably fixed to flanges 19 and 20 which may be of relatively greater thickness than the thickness of strip 16. It will be noted that flange 19 has a circular opening 21 therein through which a bolt 22 (FIGURE 1) may be inserted to secure the shock absorbing device to the floor or frame of an automobile, aircraft, etc. Flange 20, on the other hand, has an elongated slot 22 therein through which webbing 11 and 12 may be looped prior to being returned to belt length adjusting devices 14.

Strip 16 is fabricated from a ductile material, preferably a suitable metal. In this connection, metals which have been found to be suitable are copper, aluminum, bronze, and mild steel, for example. It will be noted that the width of strip 16 is substantially greater than the thickness thereof.

While a shock absorbing device comprising a strip of ductile material bent into a series of corrugations with the corrugations being of progressively increasing amplitude from one end of the strip to the other is capable of absorbing energy at a progressively increasing rate, the corrugations of larger amplitude being the first ones to flatten out when force is applied to the device, it is preferred to incorporate other features that amplify this effect in a shock absorbing device embodying this invention. Thus, as best shown in FIGURE 3, the pitch of the corrugations progressively increases from end 18 to end 17 of strip 16, and, as seen in both FIGURES 3 and 4, the thickness of strip 16 decreases progressively from end 18 of strip 16 to end 17 thereof. Furthermore, as best shown in FIGURE 2, the width of strip 16, which is the same as the width of the corrugations therein, since the corrugations extend from one side of the strip to the other, increases progressively from end 17 to end 18 of strip 16. Note that it is preferable for the end 17 of device 15 to have the corrugations of largest amplitude and pitch, thinnest section and narrowest width. All of these factors result in a shock absorbing device which is capable of absorbing energy at a progressively increasing rate. This is an important feature of a shock absorbing device embodying this invention, since the force exerted on the wearer of a safety belt provided with a shock absorbing device embodying this invention is not applied suddenly to the wearer, when the vehicle in which he is travelling is involved in a collision, but rather is applied at a progressively increasing rate, thereby reducing the possibility of the safety belt causing internal injuries to the wearer and malfunctioning of the belt or its attachments.

It will be understood that when shock absorbing device 15 is installed, it will be in the form shown in FIGURE 3. After the application of excessive force thereto, the shock absorbing device will flatten out to assume the form shown in FIGURE 4, but this flattenning out will be progressive in nature with the corrugations of larger amplitude being flattened out before the corrugations of smaller amplitude. Depending upon the magnitude of the forces applied to the shock absorbing device, all or only some of the corrugations will be flattened out.

It will be appreciated, of course, that the shock absorbing device is designed with sufficient resistance to deformation to ensure that none of its corrugations will flatten out under the influence of forces which normally may be applied thereto from the safety belt as a result of normally encountered conditions, such as sudden braking, for example. Flattening out of the corrugations will occur only when excessive forces are applied to the shock absorbing device by the safety belt, such as may be encountered as a result of a collision.

The amount of extension of strip 16 from the form thereof shown in FIGURE 3 to that shown in FIGURE 4 which is desirable is from about three to six inches in most instances. It will be appreciated, however, that the degree of extension may be increased or diminished at will by increasing or diminishing the number and/or depth of the corrugations.

It will be seen from the foregoing that shock absorbing device 15 is compact and relatively simple and inexpensive. Furthermore, it is capable of being used with existing safety belts without alteration thereof. In this regard, it should be noted that while the device may be installed at each end of the safety belt as shown in FIG. 1 it is not necessary to do so, and only one shock absorbing device may be required.

Referring to FIGURE 3, it will be seen that the bottoms 23 of the troughs between the corrugations lie in substantially a straight line in alignment with webbing 11 and 12. This is a very desirable feature, since it means that one side of the whole of the safety belt assembly is substantially flat. Furthermore, under these circumstances, the shock absorbing device can easily be installed against a flat surface.

Since strip 16 is fabricated from a ductile material, it will be appreciated that the shock absorbing device is incapable of retracting to the form shown in FIGURE 3 after it has been stressed to the condition illustrated in FIGURE 4, so that there is no reverse force applied to the wearer of the safety belt upon removal of the forces which originally caused deformation of the shock absorbing device.

Turning now to FIGURE 5, there is shown a shock absorbing device 24 which consists of a housing 25 open at both ends thereof and containing a pair of members 26 of resilient, deformable material, such as live rubber, for example, and which provide between them a generally sinusoidal or corrugated channel 27 of progressively increasing amplitude and pitch extending from one end 28 of members 26 to the other end 29 thereof. Housing 25 preferably is constructed of a strong metal, such as steel. The webbing 11 of a safety belt extends between members 26 and in channel 27 with the part of webbing 11 between the members 26 following the generally sinusoidal shape of channel 27.

In this embodiment of the invention housing 25 serves as a restraining device against which members 26 can exert force when compressed by force exerted on the safety belt tending to straighten the part of the safety belt between members 26.

In assembled form, as shown in FIGURE 5, housing 25 may be in the form of a generally rectangular, hollow tube, while members 26 may be in the form of a generally rectangular block. Preferably members 26 and housing 25 each are in two parts, the parts above webbing 11 being separate from the parts below webbing 11. Under these circumstances, shock absorbing device 24 may be assembled readily to an existing safety belt by bringing the two parts into engagement with webbing 11 from opposite sides thereof to cause webbing 11 to become sinusoidal in form, and then clamping the two parts of housing 25 together by any suitable clamping device such as bolts.

As in the embodiment of this invention illustrated in FIGURES 1 to 4, a progressive increase in the rate of absorption of energy by shock absorbing device 24 occurs.

It is not essential, of course, that the corrugations in strip 16 or channel 27 be sinusoidal.

While preferred embodiments of this invention have been disclosed herein, those skilled in the art will appreciate that changes and modifications may be made therein without departing from the spirit and scope of this invention as defined in the appended claims.

What I claim as my invention is:

1. In combination, a safety belt and a shock absorbing device secured thereto, said shock absorbing device comprising a corrugated strip of ductile material, the corrugations of said strip being of progressively increasing amplitude from one end of said strip to the other end of said strip, such that the tensile force required in said strip to straighten out one of the corrugations is different from the tensile force required in said strip to straighten out an adjacent corrugation, the corrugations of said strip being adapted to resist straightening due to forces normally applied to said safety belt, but straightening out sequentially when excessive forces are applied to said safety belt, thereby absorbing energy in discrete amounts.

2. In combination, a safety belt and a shock absorbing device according to claim 1 wherein the pitch of adjacent ones of said corrugations increases progressively from said one end of said strip to said other end of said strip.

3. In combination, as safety belt and a shock absorbing device according to claim 1 wherein the width of said strip and said corrugations decreases progressively from said one end of said strip to said other end of said strip.

4. In combination, a safety belt and a shock absorbing device according to claim 1 wherein the thickness of said strip decreases progressively from said one end of said strip to said other end of said strip.

5. In combination, a safety belt and a shock absorbing device according to claim 1 wherein said strip is substantially greater in width than in thickness and wherein said corrugations extend across the width of said strip and are generally sinusoidal.

6. In combination, a safety belt and a shock absorbing device according to claim 5 wherein there are troughs between said corrugations and the bottoms of said troughs all lie in substantially a straight line in alignment with said safety belt.

7. In combination, a safety belt and a shock absorbing device according to claim 2 wherein the width of said strip and said corrugations decreases progressively from said one end of said strip to said other end of said strip, wherein the thickness of said strip decreases progressively from said one end of said strip to said other end of said strip, and wherein said strip is substantially greater in width than in thickness, said corrugations extending across the width of said strip and being substantially sinusoidal.

8. In combination, a safety belt and a shock absorbing device according to claim 7 wherein there are troughs between said corrugations and the bottoms of said troughs all lie in substantially a straight line in alignment with said safety belt.

References Cited

UNITED STATES PATENTS

| 1,511,264 | 10/1924 | Carter. | |
|---|---|---|---|
| 2,771,128 | 11/1956 | Doolittle | 297—386 |
| 3,126,072 | 3/1964 | Johansson | 297—386 |
| 3,198,288 | 8/1965 | Presunka | 297—386 X |
| 3,217,838 | 11/1965 | Peterson et al. | |
| 3,232,383 | 2/1966 | Moberg | 297—386 |

FOREIGN PATENTS 688,604   6/1964   Canada.

JAMES T. McCALL, *Primary Examiner.*

FRANK B. SHERRY, CASMIR A. NUNBERG,
*Examiners.*